Figure 7:
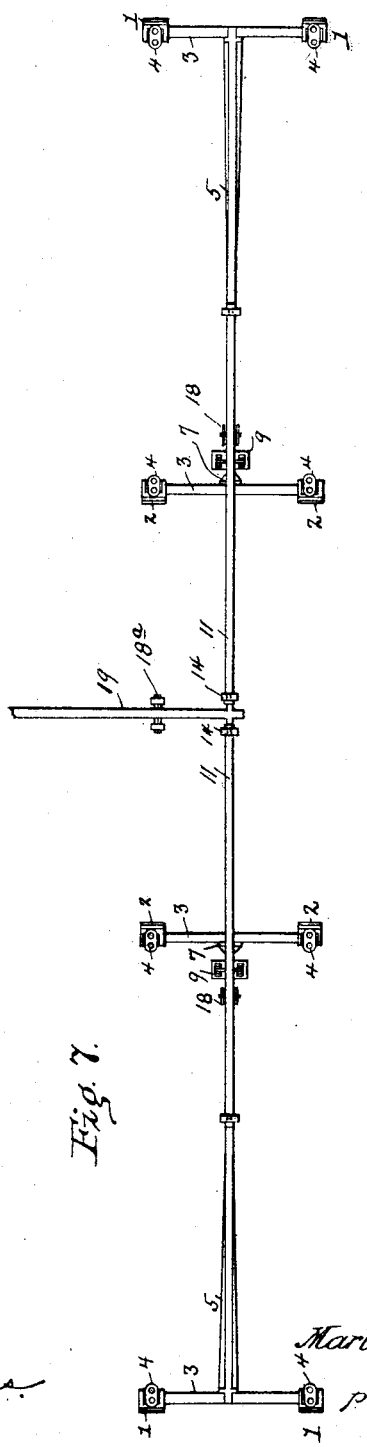

No. 634,420. Patented Oct. 3, 1899.
M. H. WINSLOW.
PLATFORM SCALE.
(Application filed Nov. 12, 1898.)
(No Model.) 2 Sheets—Sheet 1.
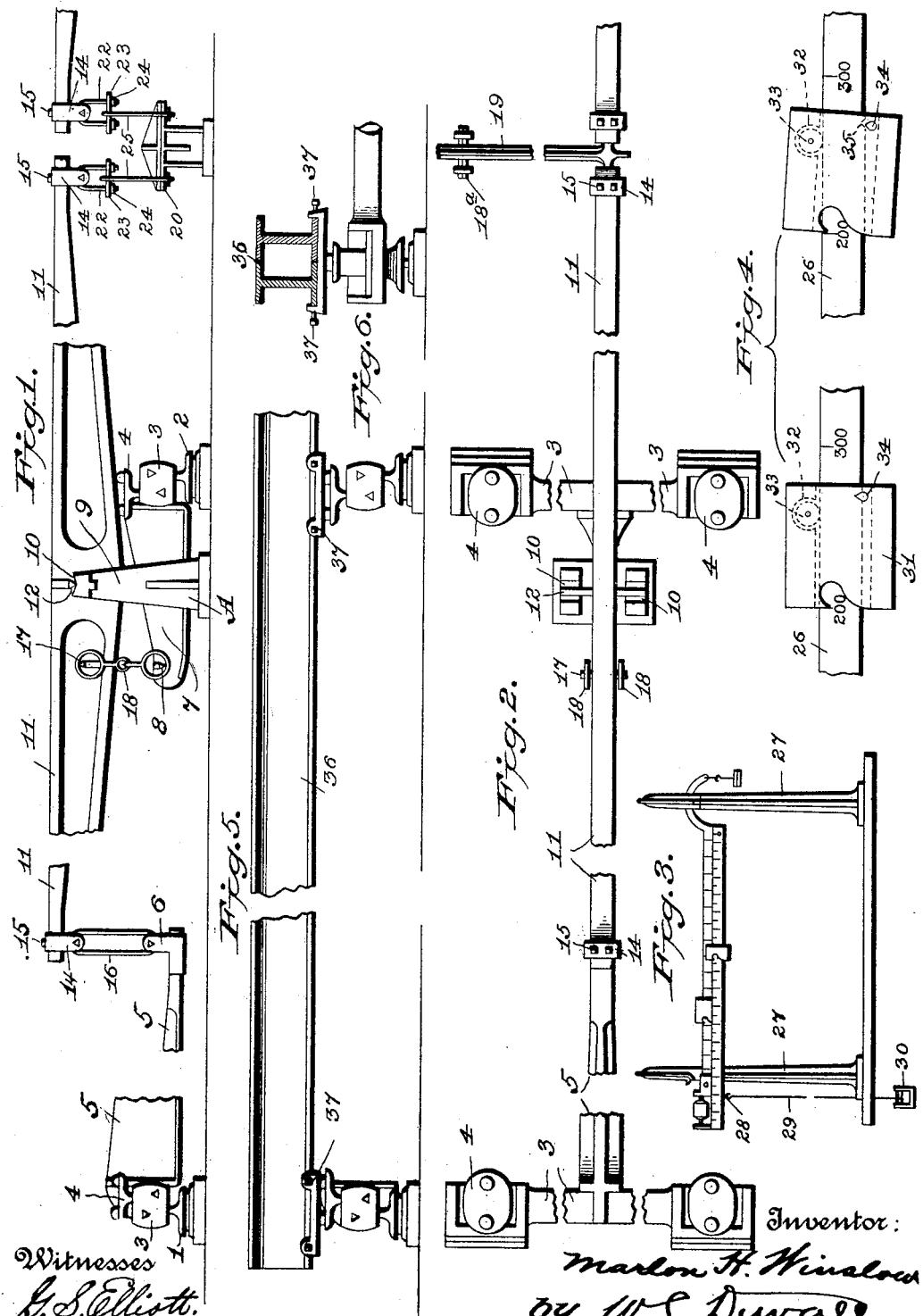
Witnesses
G. S. Elliott.
Wm. S. Hodges
Inventor:
Marlon H. Winslow
by W. S. Duvall.
Attorney
THE NORRIS PETERS CO., PHOTO-LITHO., WASHINGTON, D. C.

No. 634,420. Patented Oct. 3, 1899.
M. H. WINSLOW.
PLATFORM SCALE.
(Application filed Nov. 12, 1898.)

(No Model.) 2 Sheets—Sheet 2.

Witnesses
Wm S. Hodges
Lewis Hodges

Inventor:
Marion H. Winslow,
per W. S. Duvall
Attorney

UNITED STATES PATENT OFFICE.

MARLON H. WINSLOW, OF TERRE HAUTE, INDIANA.

PLATFORM-SCALE.

SPECIFICATION forming part of Letters Patent No. 634,420, dated October 3, 1899.

Application filed November 12, 1898. Serial No. 696,296. (No model.)

*To all whom it may concern:*

Be it known that I, MARLON H. WINSLOW, a citizen of the United States, residing at Terre Haute, in the county of Vigo and State of Indiana, have invented certain new and useful Improvements in Platform-Scales; and I do hereby declare the following to be a full, clear, and exact description of the invention, such as will enable others skilled in the art to which it appertains to make and use the same.

My invention relates to improvements in platform-scales designed particularly to be located in the tracks of railroads for the purpose of weighing cars and their cargoes.

The main objects of my invention are to improve the accuracy of such scales and to cheapen and increase the durability of their construction, which objects I attain by a simplification and a reduction of the parts employed and by a certain relative arrangement of such parts, all as will hereinafter appear in the detail description of my invention and as will be particularly pointed out in the appended claims.

Referring to the drawings, Figure 1 is a side elevation of one half of a platform-scale attached to one side of the cross-lever constructed in accordance with my invention. Fig. 2 is a plan view of the same. Fig. 3 is a detail in elevation of the scale-beam and adjacent parts. Fig. 4 is a detail of the poise, the same being shown as mounted on the beam. Fig. 5 is a side elevation of platform-scale with I-beams in position, the levers being omitted, to support platform and track. Fig. 6 is a sectional end view of the same. Fig. 7 is a diagrammatical view illustrating my improved scale.

Similar numerals of reference indicate similar parts in all the figures of the drawings.

In practice it will be understood that the scale as described is located in a pit under the rails composing a track and that the platform of the scale (not herein shown) supports the rail-sections immediately thereabove. A scale of this character intended for weighing cars at mines having one chute is usually sixty-four feet in length, and on account of this extreme length it has heretofore, so far as I am at present aware, been customary to construct the scale in not less than six sections, with evenly-balanced levers to connect the sections. It is obvious that the greater the number of sections employed the greater the complexity and inaccuracy, as well as cost and liability to become impaired. I would have it understood, however, that notwithstanding the fact that I primarily intend to construct my improved scale on the sixty-four-feet dimension, yet I can just as well by following the same construction, proportions, and arrangements construct it of any length, either greater or less than that stated.

Referring to the drawings, 1 designates a pair of transversely-opposite bearing stands or standards, and 2 a similar pair of stands or standards alining therewith longitudinally and all arranged below the tracks. Each pair of stands or standards 1 and 2 supports a transversely-disposed twist-shaft 3, which twist-shafts are of the usual well-known construction, are mounted upon suitable knife-edge bearings, and carry the upper bearings or platform-supports 4.

Disposed inwardly from each of the outer twist-shafts 3 is an end lever 5, the same being preferably tapered toward its inner end, at which point it may be provided with a yoke 6, provided with knife-edge bearings.

Mounted upon the inner twist-shaft 3 and projecting outwardly or contrary to the disposition of the end levers 5 are short levers 7, the outer or free ends of which are provided with knife-edge bearings 8. About midway these shorter levers 7 I locate pairs of vertical stands or standards 9, the same being sufficiently spaced apart to permit of the free movements of the said shorter levers 7 and are provided at their upper ends with suitable notches 10. Between these standards 9 is located a connecting-lever 11, the same fulcrumed at a point beyond or away from its center. The levers 11 are at points outside of or beyond their longitudinal centers provided at opposite sides with knife-bearings 12, which rest in the notches 10, heretofore described. The opposite ends of the connecting-levers 11 may be provided with adjustable yokes 14, the same being provided with knife-bearings and maintained in adjustable relation upon the connecting-levers by means of set-screws 15. The yokes on the outer or shorter ends of the connecting-levers 11 are connected by links 16 with the corresponding knife-bearings located in the yokes 6 on the inner free ends of the end levers 5. At points immediately above the knife-bearings 8, with which the free or outer ends of the shorter levers 7 are provided, the opposite sides of the connecting-levers 11 are likewise provided with similar knife-bearings 17, links 18 connecting the two sets of bearings. The opposite ends of the connecting-levers are extended above the usual cross-lever 19, which is fulcrumed in bearing-standards 18$^a$, from the opposite sides of which at one end is projected the knife-bearings 20, which occur directly below the adjustable yokes 14 at said inner ends of the connecting-levers 11. In the knife-bearings 21, with which the adjustable yokes 14 are provided, are loosely hung inverted-U-shaped links 22, the terminals of which are threaded and passed through suitable holes formed in tie-plates 23, below which adjusting-nuts 24 are located. Between the tie-plates and the bearings of the cross-lever are links 25, whereby, as will be apparent, the cross-lever and the inner ends of the two connecting-levers are efficiently and adjustably connected.

This completes the scale so far as its lower mechanism is concerned, and it will be apparent that the same is composed of only four sections—to wit, the two end levers and the two connecting-levers. It will of course be understood that the end, shorter, and connecting-levers are so proportioned and fulcrumed and otherwise connected that a depression or load at any point of the platform—as, for instance, at or near the platform-supports 4 of the intermediate twist-shafts 3—will cause the short levers or lever 7 to actuate the connecting lever or levers connected therewith just exactly the same as would the end levers 5 in the event of the load being located at or adjacent to the platform-supports carried by the outer twist-shaft.

In the detail figure mentioned as Fig. 3 26 designates the scale-beam, and 27 the usual standards supporting a clevis in which said scale-beam is mounted. In rear of its fulcrum-point the beam may be provided with another pivot and clevis 28, which is removably connected to the upper end of the connecting-rod 29, the lower end of the rod being connected, as is usual, to the yoke 30, with which the cross-lever is provided. It will be observed that this arrangement results in locating the platform-supports farther apart than usual. Hence in order to give the requisite strength and span successfully between these points I employ steel I-beams 36, the same preferably being arranged in parallel pairs and locked in position upon the bearing-plates by means of pinch-bolts 37.

I have also illustrated a poise 31, which is longitudinally recessed to receive the beam 26 and provided with a pointer 31$^a$ at its forward end. The width of the recess exceeds that of the beam, and in its upper side I provide a small pocket 32, in which is journaled a roller or wheel 33. The roller or wheel, which is designed to travel along the upper edge of the beam, is located slightly back of the longitudinal center of the poise, so that as a result the front or pointer end is normally elevated and the rear end normally depressed, by reason of a preponderance of weight being at the rear. The under side of the recess at its rear end is provided with a beveled rib 34, which is normally elevated into engagement with any one of a series of corresponding notches 35 with which the scale-beam is provided. It will be observed that no springs or other devices are necessarily employed to retain the poise at any point along the beam and that in order to shift the poise from one point to another it is simply necessary to depress the rear end of the same against its normal tendency, which has the effect of lowering the rib from the notch, and then move the poise along the beam upon its roller or wheel.

It will be seen that the scale as a whole is composed of very few and simple construction of parts and that thereby the cost of the same as a whole is greatly reduced, as well as the possibility of its getting out of order and improperly registering.

Having described my invention, what I claim is—

1. The combination, in a platform-scale, with a cross-lever, of connecting-levers, one arranged at each side of the cross-lever and at its inner end loosely connected to said cross-lever, opposite pairs of bearing-standards upon which said connecting-levers are fulcrumed, adjustable yokes working on the outer ends of said connecting-levers, set-screws therefor, opposite end twist-shafts and their supports located beyond the connecting-levers, a pair of end levers carried by the end twist-shafts, yokes carried thereby, links connecting the yokes of said end and connecting levers, an intermediate twist-shaft and its supports located under each connecting-lever, and a short lever connected at one end to each of said intermediate twist-shafts, and at its outer or free end connected loosely at an intermediate point of the connecting-lever thereabove.

2. The combination, in a platform-scale, with the cross-lever, of a connecting-lever arranged at each side of the same, said connecting-levers having their inner ends adjustably connected to the said cross-lever, pairs of fulcruming-standards for the connecting-levers, said standards being located beyond the longitudinal centers thereof, knife-edge bearings extending from the sides of the shorter members of said connecting-levers, an intermediate twist-shaft and its supports located intermediate each pair of said fulcruming-standards and each cross-lever, a shorter lever supported by each of these twist-shafts and knife-edge bearings at its outer free end, a loose coupling connecting the knife-edge bearings of said short and connecting levers, outer or end twist-shafts located beyond the ends of the connecting-levers, end levers connected to the said twist-shafts, inwardly disposed, and adjustable connections between said ends and said connecting-levers.

3. The combination, in a platform-scale, of a cross-lever, and opposite connecting-levers, bearings extending laterally from said cross-lever, yokes arranged to slide upon the inner ends of the connecting-levers and provided with bearings, set-screws carried by said yokes, U-shaped links depending therefrom and having their terminals threaded, tie-plates connecting said links, nuts arranged upon the terminals below the links, and links connecting the said tie-plates with the bearings on the cross-lever.

4. The combination, in a platform-scale, of a lever system, which, in addition to its cross-lever, consists of four sections, to wit, opposite connecting-levers with inner twist-shafts and shorter levers attached, and beyond the same end levers with outer twist-shafts attached, adjustable connections between the end and connecting levers, and between the inner ends of the connecting-levers and cross-lever and link connections between the free ends of shorter levers and connecting-levers.

5. The combination in a platform track-scale and the sections, of standards or supports, twist-shafts supported thereby having upper bearing-supports, and steel I-beams secured to said bearing-supports and designed to carry the load over the spaces between the sections.

In testimony whereof I affix my signature in the presence of two witnesses.

MARLON H. WINSLOW.

Witnesses:
JOHN E. BICKEL,
ALICE LEEDHAM.